United States Patent [19]
Roach

[11] Patent Number: 5,301,452
[45] Date of Patent: Apr. 12, 1994

[54] BAIT-CARRYING HOOK AND LURE

[75] Inventor: Gary F. Roach, Merrifield, Minn.

[73] Assignee: Blue Fox Tackle Co., Minneapolis, Minn.

[21] Appl. No.: 938,390

[22] Filed: Aug. 31, 1992

[51] Int. Cl.$^5$ .................... A01K 85/00; A01K 83/06
[52] U.S. Cl. ................... 43/42.29; 43/44.4; 43/42.37
[58] Field of Search ........... 43/44.2, 44.4, 44.6, 43/44.8, 42.37, 42.29

[56]  References Cited
U.S. PATENT DOCUMENTS

| | | | |
|---|---|---|---|
| 254,313 | 2/1882 | Hemming | 43/44.8 |
| 564,517 | 7/1896 | Hastings | 43/44.8 |
| 1,246,150 | 11/1917 | Parr | 43/44.4 |
| 1,325,530 | 12/1919 | Ore | 43/44.2 |
| 1,778,214 | 10/1930 | Fisher | 43/44.2 |
| 2,148,074 | 2/1939 | Kaspick | 43/44.8 |
| 2,158,794 | 5/1939 | Eppel | 43/44.4 |
| 2,228,591 | 1/1941 | Brown | 43/44.4 |
| 2,330,517 | 9/1943 | Rigandi | 43/44.8 |
| 2,407,759 | 9/1946 | McDougal | 43/44.4 |
| 2,871,611 | 2/1959 | Shepard | 43/44.2 |
| 3,839,815 | 10/1974 | Latham | 43/44.4 |
| 4,947,575 | 8/1990 | Yerkovich | 43/44.4 |

Primary Examiner—Kurt C. Rowan
Attorney, Agent, or Firm—Robert A. Elwell; Harold D. Jastram; Amy J. Hoffman

[57]  ABSTRACT

A bait-carrying fishing hook has an eye, a shank, a rearward bight terminating in a point, and a resilient leg connected to the forward end of the hook and projecting from the front of the hook. The leg has a curve adjacent its connection to the hook which curve may be exaggerated into a bow of the leg such that the center of the leg is further from the shank than the ends of the leg. The remaining portion of the leg may be held by an offset catch at the rear of the hook. The shank, catch and leg, when received in the receptor of the catch define a closed loop bait holder for holding bait on the resilient leg. A fishing lure includes a body having forward and rearward attachment eyes, a hook extending rearward from the body, a bait-carrying fishing hook and a flexible tether connecting the bait holding hook to the eye on the body.

3 Claims, 2 Drawing Sheets

BAIT-CARRYING HOOK AND LURE

BACKGROUND OF THE INVENTION

The present invention relates generally to fishing lures, and more specifically to fishing lures having a bait-carrying hook.

The use of bait to attract a fish and induce the fish to inadvertently become hooked by its mouth when attempting to consume the bait is quite old. The efficiency of hooking the fish depends in part on maintaining an ideal spacial relationship between the hook and the bait.

It is well known to thread a worm, minnow or other bait onto the point, bight, and shank of a hook. Separate from matters of efficiency, such a fishing rig suffers from a lack of durability as the bait is easily lost by unthreading. One answer to the lack of durability is a hook which is specially adapted for carrying bait, such as the bait-carrying hook disclosed by Kracht in U.S. Pat. No. 2,938,296. The Kracht hook has a typical eye, shank, bight and barbed point, as well as a bow section projecting from the eye. The bow terminates with a small hook for engagement of the shank. The arrangement serves to prevent bait which has been threaded onto the typical hook portion from sliding off. While a significant improvement over the typical hook, the Kracht hook remains limited by its inability to hold a bait in a more efficient spacial relationship, such as parallel to, but spaced apart from the shank.

Mustad sells a hook, No. 7904, which is a double hook having a resilient wire protruding forward from near the bights of the paired hooks and a receiving latch adjacent the eye. While the resilient wire provides a spaced-apart positioning of the bait relative to the shanks of the hook, the forward opening Mustad No. 7904 hook suffers from a tendency to catch on weeds and is also a dangerous unit upon which to thread a bait on the resilient wire since the points of the two hooks move towards the fisherman's fingers as bait is installed on the wire.

Garcia in U.S. Pat. No. 3,729,851 discloses a fish hook with a live shrimp-holding device. The Garcia device has a long shank, double hook to which is secured a shrimp shell-grasping member which includes a laterally movable horn ring for capturing the horn of a shrimp.

Rinaldi in U.S. Pat. No. 4,941,280 shows a fishing lure with a trailing, spaced apart, treble hook, but no bait-carrying capacity is disclosed.

Fishermen still lack a safe, effective, and easy-to-use bait-carrying hook. A lure incorporating such a hook would be particularly useful to fishermen.

SUMMARY OF THE INVENTION

The present invention, in a first embodiment, is a bait-carrying fishing hook including an eye at the forward end of the fishing hook, a shank connected to the eye with a rearward bight curving in a first direction relative to the shank, and a forward oriented point at the terminus of the bight. A resilient leg is also connected to the forward end of the hook and projects outwardly in a second direction relative to the shank. This second direction is distinct and well separated from the direction of the curve of the bight. In a preferred embodiment, the leg has a bend adjacent its connection to the hook, to provide a spaced apart and generally parallel relationship with the shank of the hook. In a most preferred embodiment of the present invention, the bend of the leg is exaggerated to the extent of forming a bow on the leg. This bow may be terminated with a recurve to assist in fastening. An offset catch protrudes from adjacent the rearward end of the hook. This offset catch also protrudes in the second direction. The offset catch has a receptor for the resilient leg. When the leg is received in the receptor of the catch, the leg catch and shank define a closed loop bait holder. This closed loop bait holder may be described as generally outside the curve or sweep of the bight of the hook. If the leg has a curve adjacent its connection to the hook, bait may be positioned in a parallel and spaced apart location, relative to the shank of the hook. Such a bait position is highly effective for hooking a fish trying to take the bait. If the curve of the leg is exaggerated to a bow, the bow additionally serves to keep the bait in a desirable orientation of the leg by reducing or limiting any tendency of the bait to twist or rotate on the leg. Preferably, the bait-carrying fish hook also has a second rearward bight curving in a third direction relative to the shank. The third direction is different from the first and second directions. Most preferably, the shanks leading to the bight are connected to a common eye and are joined along at least a portion of the shanks.

The bait-carrying hook of this invention may be connected by its eye to a flexible tether to provide a distal attachment point spaced apart from the eye of the hook.

In another embodiment, a fishing lure of the present invention has a body with at least one, and preferably two, side attachment eyes positioned on a side, preferably the upper side, of the body. A hook is rigidly connected to and extends rearward from the body. The hook has a shank, a bight curved in an upward direction, and terminates in a forward directed point. Preferably, the attachment eye or eyes on the body are positioned on the side of the body corresponding to the curve direction of the bight of the hook (i.e., on the upper side of the body). A flexible tether is connected to the eye attachment or rearward attachment eye on the body and leads rearward to an eye on the above-described bait-carrying fish hook of the present invention.

Most preferably, the lure of the present invention is attached to a fishing line either at the attachment eye on the body of the lure or most preferably to an additional eye located adjacent and immediately forward of the attachment eye or the upper side of the body carrying the tether leading to the bait-carrying fish hook.

DETAILED DESCRIPTION OF THE PREFERRED EMBODIMENTS

Figure 1:
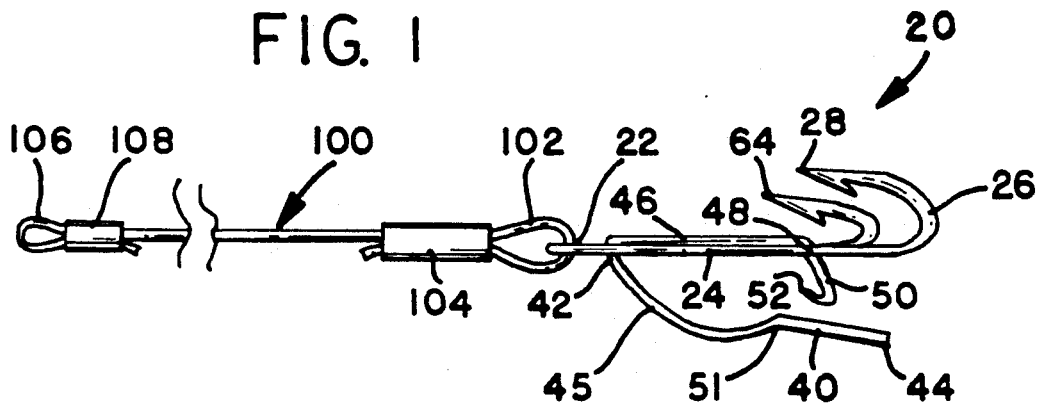
FIG. 1 is a perspective view of a preferred embodiment of the present invention.
Figure 2:
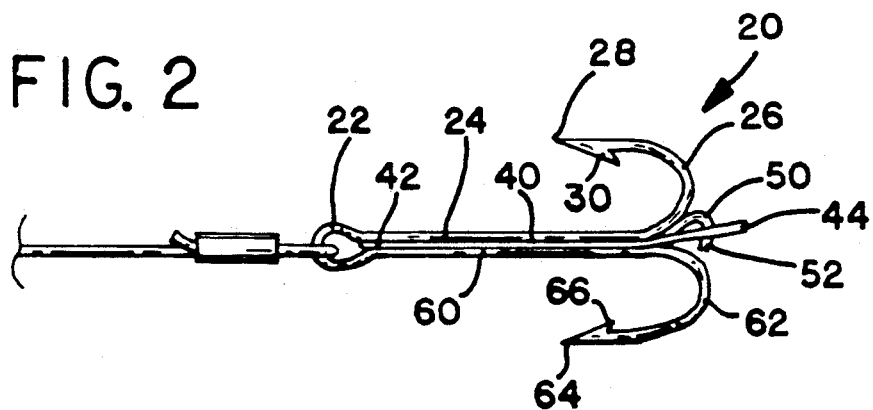
FIG. 2 is a bottom view of the embodiment of FIG. 1.

A preferred embodiment of the present invention is depicted as a bait-carrying fish hook at 20 in FIG. 1.

The hook 20 includes an eye 22 defining a forward end. A shank 24 is rigidly connected to the eye 22 and has a rearward bight 26 curving away from the shank 24 in a first direction and terminating in a forward-oriented point 28 Preferably, the point 28 includes a barb 30 adjacent the point 28 and lying within the sweep or curve of the bight 26. The hook 20 also includes a resilient leg 40 connected at its forward end 42 adjacent the forward end of the hook 20, preferably near or adjacent the eye 22. The rearward end 44 of the leg 40 projects outwardly in a different direction relative to the shank 2 (i.e. radially distinct from the direction of radial projection of the bight 26). The direction of radial projection of the leg 40 relative to the shank 24 is different from the direction of the curve or sweep of the bight 26. The leg 40 also most preferably includes a bend or curve 45, adjacent it connection with the hook 20 near the eye 22, which allows the leg 40 to achieve a nearly parallel relationship with the shank 24. In a most preferred embodiment, the bend 45 of the leg 40 is exaggerated to the extent of forming a bow on the leg 40. By "exaggerated" herein is meant that the radius of curvature of bend 45 is made larger than that of the sweep of the bight 26 and provides a bow shape to the leg 40, such that the center of the leg 40 is further from the shank 24 than its ends. This bow in the leg 40 is preferably terminated with a small recurve 51 to assist in fastening as will be explained below.

The hook 20 also includes an offset catch 50 protruding from adjacent the rearward end of the hook 20 in the different direction, that is, a direction of projection relative to the shank 24 which is generally the same as the direction of projection of the resilient leg 40. The offset catch 50 includes a receptor 52 which may receive the resilient leg 40. When the resilient leg 40 is held by the receptor 52 of the offset catch 50, the portion of leg 40 which is not part of the curve 45 lies generally parallel to and spaced apart from the shank 24. If the most preferred bowed leg 40 is present, the leg 40 will not be parallel due to its bowed shape, but rather the ends of the bow will be closer to the shank 24 than the center of the bow. The recurve 51 terminating the bow of the leg 40 will roughly correspond to a position on the leg 40 just forward of the contact of the leg 40 with the receptor 52 of the offset catch 50 and therefore provide improved fastening of the leg 40 to the catch 50.

When the resilient leg 40 is received in the receptor 52 of the offset catch 50, the shank 24, offset leg 40, and offset catch 50, define a closed loop which is lo useful for holding a bait along side the shank 24 of the hook 20. If the curve 45 of the leg 40 has been exaggerated to a bow, the bow of the leg 40 additionally serves to keep the bait in a desirable orientation on the leg 40 by reducing or limiting any tendency of the bait to twist or rotate on the leg 40. In other words, the bow of the leg 40 forces the bait to deform in order to rotate or twist. Most baits have sufficient resilience and/or resistance to deformation such that they will not rotate or twist to a significant degree under such circumstances.

Preferably, the hook 20 is a double hook such that it includes a second shank 60 connected to the eye 22 and having a rearward bight 62 curving in a third direction with respect to the shank 60 and terminating in a point 64 which is forward-directed. Again, preferably, the point 64 has a barb 66 lying within the sweep or curve of the bight 62.

Figure 3:
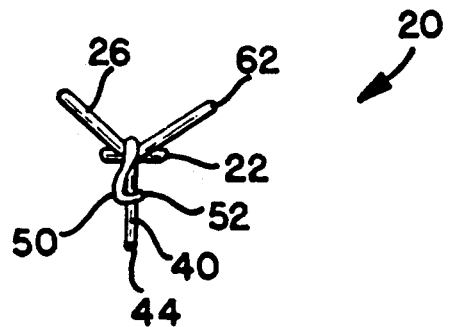
FIG. 3 is an end view of the embodiment of FIG. 1.
Figure 4:
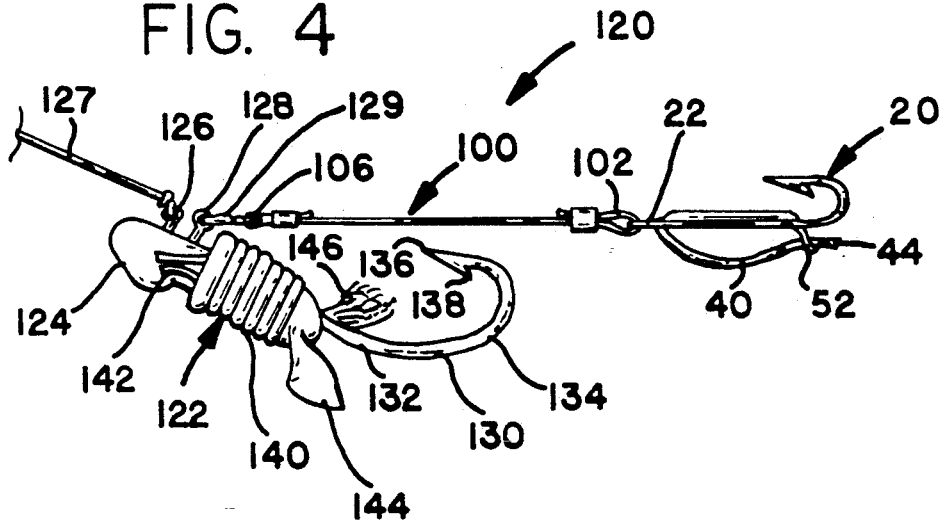
FIG. 4 is a side view of another embodiment of the present invention.

The preferred angular projection relationship of the first bight 26 and second bight 62 of a double hook with respect to the shanks 24 and 60 and the resilient leg 40 are perhaps most easily understood with reference to FIG. 3 (which is an end view of the hook 20 along the longitudinal axis of the central shanks 24, 60). That is, each of these elements project from the shanks 24, 60 in distinct directions. The angles of the first, second and third directions (i.e. projection angles relative to each other when viewed from the longitudinal axis of the shanks) are roughly equal in a most preferred embodiment with respect to the shanks 24 and 60 (i.e., the projected directions are each separated by about 120°). While the spacing of the projecting angles need not be exactly the equal angles of the preferred embodiment, there are significant advantages in positioning the bight or bights of a single or double hook generally opposite from the side of the shank on which the bait is positioned. These advantages are reflected by an increased likelihood of hooking a fish which strikes (i.e. attempts to consume the bait).

The hook 20 of the present invention may be constructed by obtaining a double hook with approximately a 120° angle between the bights 26 and 62. Commercially available versions of such hooks typically have the shanks 24 and 60 welded or otherwise rigidly and permanently connected along a majority of the length of the shanks. A strand of resilient wire is bent to form a single piece including the resilient leg 40 with a bend adjacent its forward end 42 in a sharp return curve having an angle of approximately 70° to the remaining segment 46. The remaining segment 46 corresponding generally to the length of the shanks 24 and 60 is terminated at its other en with a bend 48 having an angle of approximately 120° to the segment 46 and leading to the offset catch 50. Within the offset catch 50 a sharp transverse bend is provided to generate the receptor 52. The receptor 52 should be capable of capturing the leg 40. In assembly, the end 44 of the leg 40 is initially held near the points 28, 64; then inserted through the eye 22. Next, the offset hook 50 is slipped between the bights 26 and 62 until the segment 46 lies against the shanks 24 and 60. This segment 46 may be soldered or otherwise joined to the shanks 24, 60 at straight segment 46 to form the bait-carrying fishing hook of the present invention. Preferably, the resilient leg 40 also has a curve 45 near the eye 22 which causes the remainder of the leg 40 to be oriented parallel to the shanks 24, 60. Additionally, the curve 45 allows the accommodation of larger baits within the increased spacing between the resilient leg and the shanks 24, 60. Most preferably, the curve 45 is exaggerated into a bow terminated by a recurve 51 positioned just slightly ahead of the position on the leg which will be captured by receptor 52.

Figure 6:
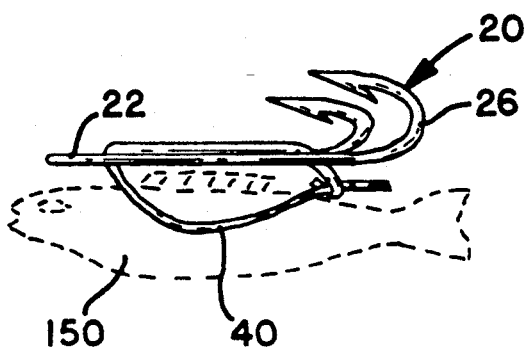
FIG. 6 is a perspective view of the hook of the present invention and showing a minnow bait in dotted outline.

The bait-carrying hook 20 may be used alone, by attachment of a fishing line to the eye 22. Bait is attached by inserting the end 44 of the resilient leg 40 into a portion of the bait and again exiting the bait while sliding the bait forward along the resilient leg 40 toward the forward end 42. Next, the resilient leg 40 is urged toward the shanks 24, 60 and into the receptor 52 to lock a bait on a forward section of the resilient leg 40 within an enclosure defined by the shanks 24 and 60, the resilient leg 40 and the offset catch 50. In other words, bait may be threaded or impaled upon the resilient leg 40 and held in a spaced apart position and generally parallel to the shanks 24, 60. Appropriate baits may be either synthetic worms, such as plastisol worms, real worms, leeches, minnows, pork rind, and other well known natural and artificial baits. Synthetic baits with integral slowrelease fish attractant chemicals or baits with externally applied fish-attracting chemicals may also be advantageously employed with the hook 20. In FIG. 6, a minnow bait 150 is shown in dotted outline to indicate its relative location when installed and being carried upon the bowed leg 40. When so installed and the leg 40 fastened, the minnow 150 is held below the bight 26 of the hook 20. Although its tail may move from side-to-side, its body is effectively prevented from twisting by the bow of the leg 40.

In a preferred embodiment, the hook 20 may also include a flexible tether 100. The tether 100 includes an attachment 102 to the eye 22 of the hook 20. The attachment 102 may be formed by a recurve loop in the flexible tether and closed with a swag or crimped metal collar 104. Alternatively, a variety of appropriate knots are well known in the art to provide a connection between the tether 100 and the eye 22 of the hook 20. The tether 100 additionally and preferably may include a second attachment 106 again formed by a swag fitting 108. Again, numerous knots are known to the art to provide a loop which is flexibly spaced apart from the eye 22 on the tether 100.

A fishing lure 120 may be assembled by using the hook 20 with the tether 100 connected to an artificial lure component 122. The artificial lure component 122 includes a body 124, having a forward attachment eye 126 for attachment to a fishing line 127 and a rearward attachment eye 128 for connection to the forward end 106 of the tether 100. A split ring 129 or other similar attachment connectors may be employed to link the forward eye 106 of the tether 100 to the rearward eye 128. The lure component 122 additionally includes a rigidly connected hook 130 including a shank 132 extending rearward from the body 124 with an upturned bight 134 terminating in a forward directed point 136. The point 136 includes a barb 138 which is located within the sweep or curve of the bight 134. That is, the barb 138 lies on a side of the point 136 generally facing the shank 132.

The artificial lure component 122 additionally may include a plastic body cover 140 on the rearward portion of the body 124 and covering the junction between the body 124 and the hook 130. Preferably, the plastic body cover 140 is a ribbed imitation of a grub or other similar simulations of natural baits. In addition to the ribs, the plastic body cover 140 may also include a plurality of plastic integral, forward directed, arms 142, rearward directed flexible fins 144, and feathers or hairlike decorations 146 protruding from the plastic grub body 140 adjacent the shank 132 of hook 130. Preferably, the body 124 is painted in an attractive coating which is highly visible and attractive to fish.

The forward and rearward eyes 126 and 128 are located adjacent each other on an upper side of the body 124. Because of their location on the upper side of the body, the lure component 122 tends to generally hang below the two eyes when fished. Additionally, as the lure 120 is moved forward through the water by pulling o the fishing line 127, the bait-carrying hook 20 tends to be trailed behind and slightly above the lure component 122. In a most preferred embodiment, the bait-carrying hook 20 is arranged on the flexible tether 100 such that the points 28 and 64 are located above the bait-carrying enclosure defined by the resilient leg 40, offset catch 50, and shanks 24 and 60. In situations where a minnow is applied on the resilient leg 40 with the head of the minnow adjacent the eye 22 and tail of the minnow adjacent the offset hook 50, the minnow serving as bait appears as a small fishing trailing the lure component 122. It has been surprisingly discovered by the inventor that large fish have a tendency to capture unattached small bait fish which tend to trail lures of the general type employed in this lure as the leading or forward positioned lure component 122. The lure 12 of the present invention takes advantage of this phenomenon by trailing the bait, such as a minnow 150, on the bait-carrying hook 20 immediately behind the lure component 122 in an imitation of the above-described phenomenon. As such, this lure is highly effective in capturing large predatory fish. The effectiveness is further enhanced by the flexibility of the tether 100 which allows life-imitating changes of position and orientation of the carried minnow 150 relative to the lure component 122. Specifically, the carried minnow 150 may drop, approach, turn, roll, etc. in a highly effective manner to deceive larger desirable fish. However, during all such motion, the relationship of the minnow 150 to the bights 26, 62 and points 28, 64 of the hook 20 remains in a constant and highly effective relationship.

Additionally, it should be noted that the upturned arrangement of the hooks 130, is advantageous in shielding from or avoiding entanglement in weeds by first its upturned bight 134 and also by the tether 100. Additionally, the preferred embodiment also employs an upturned arrangement on the bights 26 and 62 of the bait-carrying hook 20. In this arrangement reduced entanglement and snagging of weeds is also an advantage.

Figure 5:
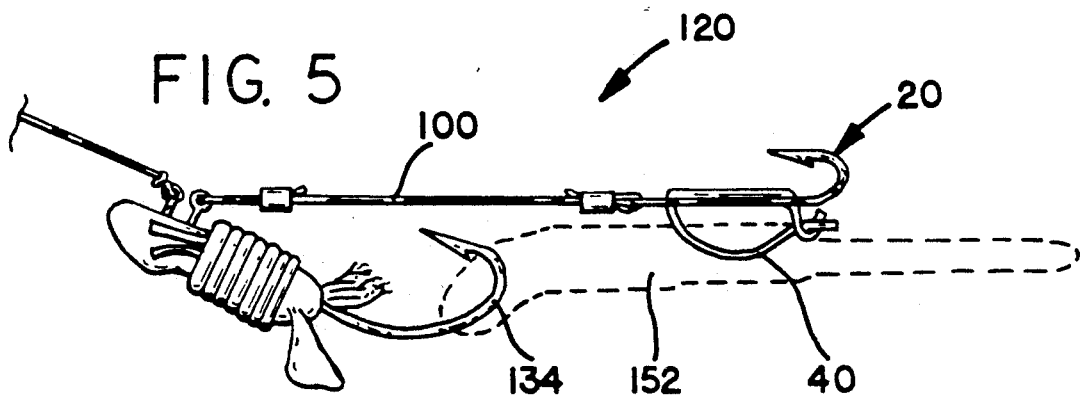
FIG. 5 is a side view of the embodiment of FIG. 4 and showing an artificial worm bait in dotted outline.

FIG. 5 shows, in dotted outline, a worm, artificial or natural, installed simultaneously upon the hook 134 of the body 122 of lure 120 and upon the leg 40 of tethered hook 20. Although the amount of independent motion is reduced by the bait coupling the two parts of the lure 120, such a bait carrying-lure 120 is highly effective. The tendency to lack durability of the bait 152 with respect to the hook 134 is reduced by the highly effective bait carrying capacity of the hook 20 which reduces the mechanical load on the worm 152 at hook 134.

It will be recognized by those familiar with the art of fishing, that the hook 20 could also be advantageously used with slip bobbers, attached to spoons, spinner rigs, crawler harnesses, and other well known and popular fishing rigs. The exposed surfaces of the hook 20 could also be painted in appropriate fish attractant colors to further enhance effectiveness while fishing.

Of course, those of ordinary skill in the art may recognize the possibility of employing "weedless" hook arrangements on the lure component 122 as well as the bait-carrying hook 20. Thus, variants of the present invention including mechanisms such as brushes or deflecting wires which lightly and resiliently cover the gap area between the eye and the point (i.e., between eye 128 and 136; or eye 22 and points 28 and 64) are also considered to be within the scope of the present invention.

It should be noted that the shank portion of some hooks is not necessarily absolutely linear but ma include some curvature. Further, the point where the shank ends and the bight begins in some hooks may be difficult to distinguish. The present invention is generally applicable to such hooks and has been described in terms of a traditional straight shanked hook with a rather distinct beginning to the bight merely to facilitate the description and understanding.

Although the present invention has been described with reference to the preferred embodiments, workers skilled in the art will recognize that changes may be made in form and detail without departing from the spirit and scope of the invention.

What is claimed is:

1. A fishing lure comprising:

a body having forward and rearward attachment eyes;

a hook, rigidly connected to and extending rearward from the body, having a shank, a bight curved in an upward direction and terminating in a forward directed point;

a bait-carrying fishing hook including:
 an eye defining a forward end of the hook;
 a shank connected to the eye and having a rearward bight curving in a first direction relative to the shank, the bight terminating in a forward oriented point;
 a resilient leg connected to the forward end of the hook and projecting outwardly in a second direction relative to the shank, the second direction distinct from the direction of curve of the bight; and
 an offset catch protruding from adjacent the rearward end the hook in the second direction, the offset catch having a receptor for the resilient leg; and
 wherein the shank, catch and leg, when received in the receptor of the catch define a closed loop bait holder; and a flexible tether connected at a first end to the rearward attachment eye and connected at a second end to the eye of the bait-carrying hook.

2. The fishing lure of claim 1 and wherein the resilient leg of the bait-carrying hook includes a curve adjacent its connection to the forward end of the hook, the curve orienting the remainder of the leg in a spaced apart and generally parallel position relative to the shank.

3. The bait-carrying hook of claim 1 and wherein the resilient leg includes an exaggerated curve which bows the center of the leg outward from the shank and serves to reduce twisting of a bait installed thereon.

* * * * *